(12) United States Patent
Kodama et al.

(10) Patent No.: US 10,014,559 B2
(45) Date of Patent: Jul. 3, 2018

(54) ALL SOLID STATE BATTERY

(71) Applicant: TOYOTA JIDOSHA KABUSHIKI KAISHA, Toyota-shi, Aichi-ken (JP)

(72) Inventors: Masashi Kodama, Hadano (JP); Satoshi Wakasugi, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 15/278,494

(22) Filed: Sep. 28, 2016

(65) Prior Publication Data
US 2017/0104245 A1 Apr. 13, 2017

(30) Foreign Application Priority Data
Oct. 8, 2015 (JP) .................. 2015-200421

(51) Int. Cl.
| | |
|---|---|
| *H01M 6/18* | (2006.01) |
| *H01M 10/42* | (2006.01) |
| *H01M 4/36* | (2006.01) |
| *H01M 4/587* | (2010.01) |
| *H01M 4/62* | (2006.01) |
| *H01M 10/0562* | (2010.01) |
| *H01M 4/133* | (2010.01) |
| *H01M 10/0525* | (2010.01) |

(Continued)

(52) U.S. Cl.
CPC ....... *H01M 10/4235* (2013.01); *H01M 4/133* (2013.01); *H01M 4/366* (2013.01); *H01M 4/587* (2013.01); *H01M 4/62* (2013.01); *H01M 4/622* (2013.01); *H01M 4/624* (2013.01); *H01M 10/0525* (2013.01); *H01M 10/0562* (2013.01); *H01M 4/505* (2013.01); *H01M 4/525* (2013.01); *H01M 6/18* (2013.01); *H01M 2220/20* (2013.01); *H01M 2300/0068* (2013.01); *Y02E 60/122* (2013.01)

(58) Field of Classification Search
CPC ....................................................... H01M 6/18
See application file for complete search history.

(56) References Cited

U.S. PATENT DOCUMENTS

| | | |
|---|---|---|
| 6,605,386 B1 | 8/2003 | Kasamatsu et al. |
| 2015/0188193 A1* | 7/2015 | Kodama ............. H01M 10/052 429/188 |
| 2016/0211519 A1 | 7/2016 | Uchiyama et al. |

FOREIGN PATENT DOCUMENTS

| | | |
|---|---|---|
| JP | 2000-173586 A | 6/2000 |
| JP | 2001-185152 A | 7/2001 |

(Continued)

*Primary Examiner* — Jacob Marks
(74) *Attorney, Agent, or Firm* — Oliff PLC

(57) ABSTRACT

The main object of the present invention is to provide an all solid state battery with capability of inhibiting heat generation of an anode layer. The present invention solves the problem by providing an all solid state battery comprising a cathode layer, an anode layer, and a solid electrolyte layer formed between the cathode layer and the anode layer, wherein at least one of the anode layer and the solid electrolyte layer contains a sulfide solid electrolyte material; the anode layer contains an anode active material that is graphite, and contains an additive; and the additive has an oxide that is at least one kind of $MoO_3$, $Sb_2O_3$, and $MnCO_3$, and a coating portion that coats at least a part of the oxide and includes a resin with a hydrocarbon chain as a main chain.

4 Claims, 2 Drawing Sheets

(51) Int. Cl.
*H01M 4/505* (2010.01)
*H01M 4/525* (2010.01)

(56) References Cited

FOREIGN PATENT DOCUMENTS

JP 2015-056307 A 3/2015
JP 2015-072818 A 4/2015

* cited by examiner

ALL SOLID STATE BATTERY

TECHNICAL FIELD

The present invention relates to an all solid state battery with capability of inhibiting heat generation of an anode layer.

BACKGROUND ART

In accordance with a rapid spread of information relevant apparatuses and communication apparatuses such as a personal computer, a video camera and a portable telephone in recent years, the development of a battery to be used as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the structure for preventing the short circuit are necessary therefor. In contrast, an all solid lithium battery all-solidified by replacing the liquid electrolyte with a solid electrolyte layer is conceived to intend the simplification of the safety device and be excellent in production cost and productivity for the reason that the flammable organic solvent is not used in the battery. Moreover, an all solid state battery utilizing a sulfide solid electrolyte material has an advantage of being excellent in Li ion conductivity.

For example, Patent Literature 1 discloses a coated cathode active material comprising a cathode active material (such as $LiNi_{1/3}Co_{1/3}Mn_{1/3}O_2$) and a coating layer (such as $LiNbO_3$), wherein a carbonate concentration in the coating layer is in the range of 800 ppm to 3500 ppm. Patent Literature 1 discloses an all solid state battery comprising a cathode layer containing a coated cathode active material, an anode layer containing graphite as an anode active material, and a solid electrolyte layer containing a sulfide solid electrolyte material. The object of Patent Literature 1 is to decrease of a battery resistance.

CITATION LIST

Patent Literature

Patent Literature 1: Japanese Patent Application Publication (JP-A) No. 2015-072818

SUMMARY OF INVENTION

Technical Problem

Patent Literature 1 discloses a configuration that the anode layer includes graphite and a sulfide solid electrolyte material. However, an all solid state battery having such anode layer may generate heat in the anode layer when the battery is exposed to high temperature in charged state, for example.

The present invention is made in a nod to the circumstances and a main object thereof is to provide an all solid state battery with capability of inhibiting heat generation of an anode layer.

Solution to Problem

In order to achieve the object, the inventors of the present application have obtained knowledge through their research that $MoO_3$, $Sb_2O_3$, and $MnCO_3$ react with Li, and the calorific value at the time of the reaction is small. The inventors then found out that the heat generation of an anode layer may be inhibited by using these specific oxides, and have completed the present invention.

Present invention provides an all solid state battery comprising a cathode layer, an anode layer, and a solid electrolyte layer formed between the cathode layer and the anode layer, wherein at least one of the anode layer and the solid electrolyte layer contains a sulfide solid electrolyte material; the anode layer contains an anode active material that is graphite, and contains an additive; and the additive has an oxide that is at least one kind of $MoO_3$, $Sb_2O_3$, and $MnCO_3$, and a coating portion that coats at least a part of the oxide and includes a resin with a hydrocarbon chain as a main chain.

According to the present invention, an anode layer contains an additive having the specific oxide coated with a resin so that the oxide may actively react with Li only when in the state of high temperature. Moreover, the specific oxides have small calorific value at the time of the reaction with Li. Accordingly, heat generation of an anode layer may be inhibited even when the battery is exposed to high temperature in charged state, for example.

In the present invention, a content of the additive in the anode layer is preferably in the range of 5% by weight to 30% by weight.

Advantageous Effects of Invention

The all solid state battery of the present invention exhibits an effect that can inhibit heat generation of an anode layer.

DESCRIPTION OF EMBODIMENTS

An all solid state battery of the present invention is hereinafter described in detail.

Figure 1:
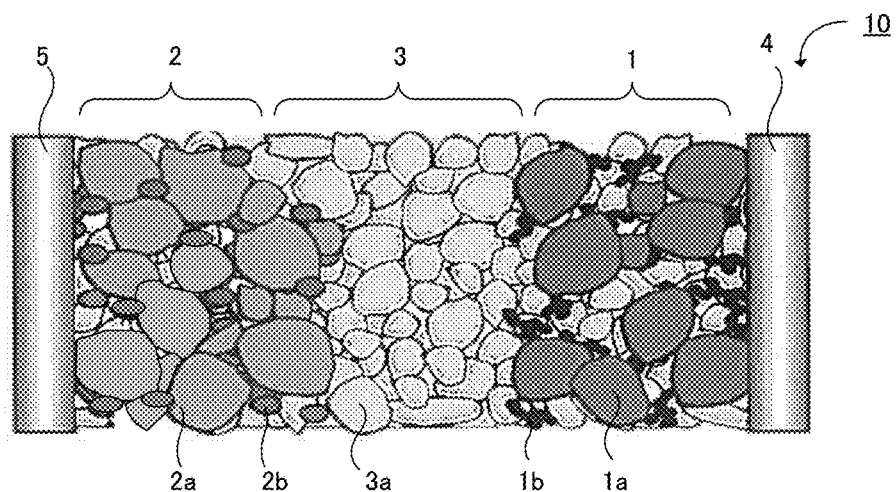
FIG. 1 is a schematic cross-sectional view illustrating an example of an all solid state battery of the present invention.

FIG. 1 is a schematic cross-sectional view illustrating an example of an all solid state battery of the present invention. An all solid state battery 10 illustrated in FIG. 1 has a cathode layer 1, an anode layer 2, and a solid electrolyte layer 3 formed between the cathode layer 1 and the anode layer 2. In FIG. 1, both of the anode layer 2 and the solid electrolyte layer 3 contain a sulfide solid electrolyte material 3a. The anode layer 2 contains an anode active material 2a that is graphite, and contains an additive 2b, and the additive 2b has an oxide 2c that is at least one kind of $MoO_3$, $Sb_2O_3$, and $MnCO_3$, and a coating portion 2d that coats at least a part of the oxide 2c and includes a resin with a hydrocarbon chain as a main chain.

According to the present invention, an anode layer contains an additive having the specific oxide coated with a resin so that the oxide may actively react with Li only when in the state of high temperature. Moreover, the specific oxides have small calorific value at the time of the reaction with Li. Accordingly, heat generation of an anode layer may be inhibited even when the battery is exposed to high temperature in charged state, for example.

As described above, an all solid state battery having an anode layer that contains graphite and a sulfide solid electrolyte material may generate heat in the anode layer when the battery is put under the condition of high temperature in the charged state. Incidentally, the charged state refers to the battery with SOC (State of charge) of 10% or more for example, and the SOC may be 30% or more, may be 50% or more, and may be 70% or more. Also, the condition of high temperature refers to the condition of 150° C. or more, for example. Also, the reason why the anode layer generates heat is presumed to be the followings. When the anode layer in the charged state is put under the condition of high temperature, Li intercalated in graphite is released so that the released Li reacts with sulfur (S) of the sulfide solid electrolyte material, and thus the anode layer generates heat.

The inventors of the present application have obtained knowledge through their hard research that $MoO_3$, $Sb_2O_3$, and $MnCO_3$ react with Li, and the calorific value at the time of the reaction is smaller than the calorific value at the time of the reaction of Li and a sulfide solid electrolyte material.

Upon the finding, the inventors of the present application tried to inhibit heat generation of the anode layer under the condition of high temperature by adding these specific oxides to the anode layer, and they found out that the battery performance of the all solid state battery (such as coulomb efficiency at the first charge and discharge) was deteriorated, as shown in later described Comparative Examples 2 to 4. The reason why the battery performance of the all solid state battery was deteriorated is presumed to be that $MoO_3$, $Sb_2O_3$, and $MnCO_3$ have difficulty in releasing the reacted (absorbed) Li.

Upon the finding, the inventors of the present application added the additive having $MoO_3$, $Sb_2O_3$, and $MnCO_3$ coated with a resin, into the anode layer. The addition of the additive may prevent the materials such as $MoO_3$ from reacting with Li at the normal temperature for battery use, but allows the oxide to actively react with Li only when the all solid state battery is exposed to high temperature (when the resin is softened or decomposed by heat). Further, the materials such as $MoO_3$ have small calorific value at the time of the reaction with Li. As the result, the inventors of the present application found out the way to inhibit heat generation of the anode layer and achieved the present invention.

Incidentally, carbon is conventionally used as an anode active material in the field of batteries. Carbon has high stability; it is recognized that carbon does not substantially react with a sulfide solid electrolyte material at the normal temperature for battery use (such as less than 100° C.) regardless of being in charged state or discharged state. Under such recognition, the additive is not daringly added to an anode layer. Also, it is concerned that the battery performance may be deteriorated if a material that reacts with Li is added into the electrolyte layer. Accordingly, one having ordinary skill in the art is not motivated to add a material that reacts with Li into the electrolyte layer.

The all solid state battery of the present invention is hereinafter described in each constitution.

1. Anode Layer

An anode layer in the present invention contains an anode active material that is graphite, and contains an additive.

(1) Additive

An additive in the present invention has a specific oxide, and a coating portion that coats at least a part of the oxide and includes a resin with a hydrocarbon chain as the main chain.

(i) Oxide

An oxide in the present invention is usually at least one kind of $MoO_3$, $Sb_2O_3$, and $MnCO_3$. The oxide in the present invention reacts with Li, and the oxide features the configuration that the calorific value at the time of the reaction is small. Also, the oxide in the present invention usually does not have substantial electron conductivity or ion conductivity. "Not having substantial electron conductivity or ion conductivity" means that the oxide does not have electron conductivity or ion conductivity to the extent that the battery reaction of the all solid state battery is not interfered.

In terms of the oxide, only one kind of $MoO_3$, $Sb_2O_3$, and $MnCO_3$ may be used and the combination of two or more kinds may be selected and used. Above all, the oxide is preferably $MnCO_3$. The reason therefor is because it is easy to form a coating portion with $MnCO_3$, and $MnCO_3$ is reasonable.

Examples of the shape of the oxide may include a granular shape. Examples of the granular shape may include a spherical shape. The average particle diameter ($D_{50}$) of the oxide is not particularly limited, but is preferably 1 μm or more for example, and more preferably 5 μm or more. Also, the average particle diameter of the oxide is preferably 10 μm or less for example, and more preferably 8 μm or less. The reason therefor is because coating a part of the oxide with the coating portion may possibly be difficult if the average particle diameter of the oxide is too small. On the other hand, the battery capacity may possibly be decreased if the particle diameter of the oxide is too large because the volume of the additive becomes large thereby. Incidentally, the average particle diameter may be measured by measurement methods such as particle size distribution measurement by laser diffraction scattering method and a measurement by a particle size distribution meter. The oxide may be a primary particle, and may be a secondary particle.

The proportion of the oxide in the additive is not particularly limited, but is preferably 50% by weight or more for example, and more preferably 75% by weight or more. Also, the content of the oxide in the additive is 98% by weight or less for example, and above all, is preferably 95% by weight or less. The reason therefor is because the sufficient inhibition of heat generation in the anode layer may possibly be difficult if the proportion of the oxide is too small. On the other hand, coating a coating portion on the oxide may possibly be difficult if the proportion of the oxide is too large.

(ii) Coating Portion

The coating portion in the present invention coats at least a part of the oxide, and includes a resin with a hydrocarbon chain as the main chain. The coating portion restrains the oxide from reacting with Li at the time of normal battery use. Meanwhile, the coating portion allows the oxide to react with Li by exposing the oxide at the time the battery is exposed to high temperature for the reason that the coating portion itself is softened or decomposed. In these manners, the coating portion has the feature that allows the oxide to actively react with Li only when in the state of high temperature.

The coating portion substantially does not change at the time of normal battery use, for example, in the temperature of 100° C. or less. "The coating portion substantially does not change" means that the coating portion is not softened or decomposed, and does not react with each component contained in the anode layer to the extent that the battery reaction at the time of normal battery use is not interfered.

The coating portion includes a resin with a hydrocarbon chain as the main chain. "A resin with a hydrocarbon chain as the main chain" means that the main chain may be a hydrocarbon chain, and may or may not include a functional group. For example, it refers to the resin represented by the following general formula $—(R^1R^2C—CR^3R^4)_n—$ (in the formula, $R^1$, $R^2$, $R^3$, and $R^4$ are each independently hydrogen, chlorine, an alkyl group, or an ester group).

If the functional group is an alkyl group, the carbon number is preferably in the range of 1 to 3, for example. Also, if the functional group is an ester group, the carbon number is preferably 1, for example.

Examples of the resin with a hydrocarbon chain as the main chain may include polyolefin resins such as polyethylene (PE) and polypropylene (PP). Also, examples of the resin with a hydrocarbon chain as the main chain may include an acrylic resin. Examples of the acrylic resin may include polymethacrylic ester resins such as polymethacrylic methyl (PMMA) and polymethacrylic butyl, polyacrylic ester resins such as polyacrylic butyl, and copolymer of methacrylic ester and acrylic ester. Furthermore, examples of the resin with a hydrocarbon chain as the main chain may include vinyl chloride resins such as polyvinyl chloride (PVC).

The resin with a hydrocarbon chain as the main chain is preferably the resin that is softened or decomposed in the range of 100° C. to 200° C. for example. The reason therefor is to allow the oxide to be easily exposed so as to react with Li when the all solid state battery is exposed to high temperature.

The coating portion may include only the resin with a hydrocarbon chain as the main chain, and may include other components. The proportion of the resin in the coating portion is 50% by weight or more for example, may be 70% by weight or more, and may be 90% by weight or more.

Figure 2A:
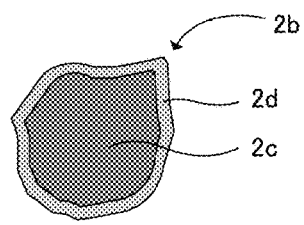
FIGS. 2A to 2B are schematic cross-sectional views illustrating an example of an additive in the present invention and the other example.
Figure 2B:
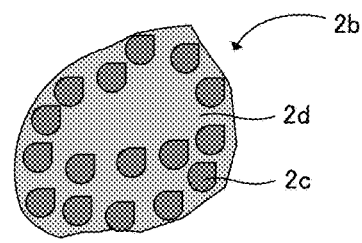

The coating portion may coat at least a part of the oxide. For example, if the oxide is granular shape, as shown in FIG. 2A, the coating portion 2d may coat one particle of the oxide 2c, and as shown in FIG. 2B, the coating portion 2d may coat plural particles of the oxide 2c respectively. The condition in which the coating portion 2d coats plural particles of the oxide 2c respectively is, in other words, the condition in which the plural particles of the oxide 2c are buried in the coating portion 2d. Above all, in the present invention, as shown in FIG. 2A, the coating portion 2d preferably coats one particle of the oxide 2c. The reason therefor is to decrease the volume of the additive. Incidentally, the particle may be a primary particle, and may be a secondary particle in this case.

The coverage factor of the coating portion is preferably 50% or more for example, and preferably 80% or more above all. Also, the coverage factor of the coating portion may be 100%. The coverage factor may be measured by methods such as a transmission electron microscope (TEM) and X ray photoelectron spectrometry (XPS).

Also, the average thickness of the coating portion is in the range of 100 nm to 1000 nm for example, and preferably in the range of 100 nm to 300 nm above all. The average thickness of the coating portion may be measured by methods such as observation (n≥100, for example) in means of a transmission electron microscope (TEM).

(iii) Additive

The content of the additive in the anode layer is not particularly limited, but is preferably 5% by weight or more for example, and preferably 10% by weight or more. On the other hand, the content of the additive in the anode layer is preferably 30% by weight or less, and preferably 20% by weight or less. If the content of the additive in the anode layer is too small, it may be difficult to inhibit the heat generation of the anode layer sufficiently. On the other hand, too large content of the additive in the anode layer decreases the content of the anode active material relatively and it may be difficult to secure the electron conductivity and ion conductivity sufficiently.

Examples of the method for forming the additive may include a method such that the oxide is coated with the coating material (resin powder) mechanically, or the oxide is buried in the coating material. Specifically, the method in means of a particle compositing apparatus may be exemplified. Examples of the particle compositing apparatuses may include Nobilta™ (NOB-MINI) manufactured by Hosokawa Micron Corporation. The rotation number of the particle compositing apparatus may be adjusted in the range of 3000 rpm to 4000 rpm for example, and the rotation time may be adjusted in the range of 10 minutes to 30 minutes.

A resin particle (powder) to be used for the coating portion may be used as the coating material, for example. The average particle diameter ($D_{50}$) of the coating material is not particularly limited, but preferably in the range of 0.1 µm to 100 µm, more preferably in the range of 0.1 µm to 10 µm, and particularly preferably in the range of 0.1 µm to 1.0 µm. For example, the coating material having the average particle diameter of 1/10 to 1/100 to the average particle diameter of the oxide may be selected when coating a particle of the oxide with the coating portion. On the other hand, the coating material having the average particle diameter of 10 times to 100 times of the average particle diameter of the oxide may be selected when burying the oxide in the coating portion.

(2) Anode Active Material

The anode active material in the present invention is usually graphite.

The graphite in the present invention is usually a carbon material having at least a graphite structure. The "graphite structure" signifies a layered-shape structure in which hexagonal net surfaces of carbon (graphene) are laminated. Among 4 pieces of carbon valence electrons, 3 pieces form the hexagonal net surface by forming a $SP^2$ hybrid orbit, and the remaining 1 piece (π electron) forms a van der Waals bond in the laminate direction.

The content of the carbon component in the graphite is 70% by weight or more for example, preferably 80% by weight or more, and more preferably 90% by weight or more. The graphite may contain just the carbon component and may contain the carbon component and another component, but preferably contains just the carbon component.

The graphite may have at least the graphite structure. Examples of the anode active material may include graphite such as natural graphite and artificial graphite, hardly graphitized carbon (hard carbon), and easily graphitized carbon (soft carbon). Also, the anode active material may be an active material having an amorphous carbon layer on its surface. D/G ratio of the anode active material is in the range of 0.1 to 1.2, for example.

Examples of the shape of the anode active material may include a granular shape. Examples of the granular shape may include a spherical shape and a fiber shape. The average particle diameter ($D_{50}$) of the anode active material is not particularly limited, but is in the range of 0.1 µm to 50 µm for example, and preferably in the range of 1 µm to 20 µm.

The content of the anode active material in the anode layer is not particularly limited, but is preferably set in the range of 40% by weight to 99% by weight, for example.

(3) Anode Layer

The anode layer contains at least an anode active material and an additive. Also, in the present invention, the anode layer preferably further contains a solid electrolyte material. The reason therefor is to allow the anode layer with high ion conductivity. The solid electrolyte material may be a sulfide solid electrolyte material and may be an oxide solid electrolyte material, but a sulfide solid electrolyte material is preferable. Incidentally, the additive in the present invention is usually in contact with the sulfide solid electrolyte material contained in at least one of the anode layer and the solid electrolyte layer.

Examples of the sulfide solid electrolyte material may include LiI—$Li_2S$—$SiS_2$, LiI—$Li_2S$—$P_2O_5$, LiI—$Li_3PO_4$—$P_2S_5$, $Li_2S$—$P_2S_5$, LiI—$Li_3PS_4$, LiI—LiBr—$Li_3PS_4$, $Li_3PS_4$, $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that m, n is a positive number; Z is one of Ge, Zn, and Ga), $Li_2S$—$GeS_2$, $Li_2S$—$SiS_2$—$Li_3PO_4$, and $Li_2S$—$SiS_2$—$Li_xMO_y$ (provided that x, y is a positive number; M is one of P, Si, Ge, B, Al, Ga, and In). Incidentally, the description "$Li_2S$—$P_2S_5$" signifies the sulfide solid electrolyte material comprising a raw material composition including $Li_2S$ and $P_2S_5$, and the same applies to other descriptions.

The sulfide solid electrolyte material may have a $Li_3PS_4$ skeleton for example, may have a $Li_4P_2S_7$ skeleton, and may have a $Li_4P_2S_6$ skeleton. Examples of the sulfide solid electrolyte material having a $Li_3PS_4$ skeleton may include LiI—$Li_3PS_4$, LiI—LiBr—$Li_3PS_4$, and $Li_3PS_4$. Also, examples of the sulfide solid electrolyte material having a $Li_4P_2S_7$ skeleton may include $Li_7P_3S_{11}$. Further, a substance such as LGPS represented by $Li_{(4-x)}Ge_{(1-x)}P_xS_4$ (x satisfies 0<x<1) may be used as the sulfide solid electrolyte material, for example.

The sulfide solid electrolyte material in the present invention is preferably a sulfide solid electrolyte material including a P element, and the sulfide solid electrolyte material is preferably a material containing $Li_2S$—$P_2S_5$ mainly. Further, the sulfide solid electrolyte material may contain a halogen (F, Cl, Br, and I).

Also, if the sulfide solid electrolyte material is a $Li_2S$—$P_2S_5$ series, the proportion of $Li_2S$ and $P_2S_5$ is preferably in the range of $Li_2S:P_2S_5=50:50$ to 100:0 in a molar ratio; above all, preferably $Li_2S:P_2S_5=70:30$ to 80:20.

Also, the sulfide solid electrolyte material may be a sulfide glass, may be a crystallized sulfide glass, and may be a crystalline material obtained by a solid phase method. Incidentally, the sulfide glass may be obtained by methods such as conducting mechanical milling (such as a ball mill) to a raw material composition. Further, the crystallized sulfide glass may be obtained by methods such as heat-treating the sulfide glass at the crystallizing temperature or more. Furthermore, the ion conductivity (such as Li ion conductivity) of the sulfide solid electrolyte material at the normal temperature (25° C.) is preferably $1\times10^{-5}$ S/cm or more for example, and more preferably $1\times10^{-4}$ S/cm or more. The ion conductivity may be measured by an alternating current impedance method.

On the other hand, examples of the oxide solid electrolyte material may include a compound having a NASICON type structure. Examples of the compound having a NASICON type structure may include a compound (LAGP) represented by the general formula $Li_{1+x}Al_xGe_{2-x}(PO_4)_3$ (0≤x≤2) and a compound (LATP) represented by the general formula $Li_{1+x}Al_xTi_{2-x}(PO_4)_3$ (0≤x≤2). Also, other examples of the oxide solid electrolyte material may include LiLaTiO (such as $Li_{0.34}La_{0.51}TiO_3$), LiPON (such as $Li_{2.9}PO_{3.3}N_{0.46}$), and LiLaZrO (such as $Li_7La_3Zr_2O_{12}$).

Examples of the shape of the solid electrolyte material in the present invention may include a granular shape such as a spherical shape and an oval shape, and a thin film shape. When the solid electrolyte material is a granular shape, the average particle diameter ($D_{50}$) is not particularly limited, but is preferably 40 μm or less, more preferably 20 μm or less, and even more preferably 10 μm or less. On the other hand, the average particle diameter is preferably 0.01 μm or more, and more preferably 0.1 μm or more.

The content of the solid electrolyte material in the anode layer to be used for the present invention is preferably in the range of 1% by weight to 90% by weight for example, and more preferably in the range of 10% by weight to 80% by weight.

The anode layer in the present invention may further contain at least one of a conductive material and a binder, other than the above described anode active material and solid electrolyte material. Examples of the conductive material may include carbon materials such as acetylene black, Ketjen black, and carbon fiber (VGCF), nickel, aluminum, and SUS. Also, the anode layer may not contain a conductive material. Examples of the binder may include fluorine containing binders such as polyvinylidene fluoride (PVdF), polytetrafluoroethylene (PTFE), styrene butadiene rubber (SBR), butadiene rubber (BR), and acrylate butadiene rubber (ABR). The thickness of the anode layer varies in accordance with the constitution of the objected all solid state battery, but preferably set in the range of 0.1 μm to 1000 μm, for example.

2. Solid Electrolyte Layer

The solid electrolyte layer in the present invention is formed between the cathode layer and the anode layer, and usually contains a solid electrolyte material. Specific examples of the solid electrolyte material are in the same contents as those described above, thus the description herein is omitted.

The content of the solid electrolyte material in the solid electrolyte layer is preferably in the range of 10% by weight to 100% by weight for example, and more preferably in the range of 50% by weight to 100% by weight.

The solid electrolyte layer may contain a binder other than the above described materials. The contents of the binder is the same as those described above, thus the description herein is omitted. The thickness of the solid electrolyte layer varies in accordance with the constitution of the objected all solid state battery, but is preferably in the range of 0.1 μm to 100 μm for example, and more preferably in the range of 0.1 μm to 300 μm.

3. Cathode Layer

The cathode layer in the present invention is a layer containing at least a cathode active material, and may contain at least one of a solid electrolyte material, a conductive material, and a binder, as necessary. Incidentally, the contents of the solid electrolyte material, the conductive material and the binder are the same as those described above, thus the description herein is omitted.

The kind of the cathode active material is appropriately selected in accordance with the kind of the all solid state battery, and examples thereof may include an oxide active material and a sulfide active material. Examples of the oxide active material may include rock salt bed type active materials such as $LiCoO_2$, $LiMnO_2$, $LiNiO_2$, $LiVO_2$, $LiNi_{1/3}Co_{1/3}Mn_{1/3}O_2$, spinel type active materials such as $LiMn_2O_4$, $LiNi_{0.5}Mn_{1.5}O_4$, olivine type active materials such as $LiFePO_4$, and $LiMnPO_4$, and Si containing active materials such as $Li_2FeSiO_4$, and $Li_2MnSiO_4$. Also, other examples of the oxide active material may include $Li_4Ti_5O_{12}$.

Examples of the shape of the cathode active material may include a granular shape and a thin film shape. When the cathode active material is a granular shape, the average particle diameter ($D_{50}$) is preferably in the range of 1 nm to 100 μm for example, and more preferably in the range of 10 nm to 30 μm. The content of the cathode active material in the cathode layer is not particularly limited, but preferably in the range of 40% by weight to 99% by weight, for example.

The thickness of the cathode layer in the present invention varies in accordance with the constitution of the objected all solid state battery, but preferably in the range of 0.1 μm to 1000 μm, for example.

4. All Solid State Battery

The all solid state battery of the present invention comprises at least a cathode layer, an anode layer, and a solid electrolyte layer. The all solid state battery usually further comprises a cathode current collector for collecting currents of the cathode active material, and an anode current collector for collecting currents of the anode active material. Examples of the material for the cathode current collector may include SUS, aluminum, nickel, iron, titanium, and carbon. On the other hand, examples of the material for an anode current collector may include SUS, copper, nickel, and carbon. Also, the all solid state battery of the present invention may have a battery case.

The all solid state battery of the present invention may be a primary battery and may be a secondary batter, but preferably a secondary battery. The reason therefor is to be repeatedly charged and discharged and be useful as a car mounted battery for example. Incidentally, a primary battery includes usage of a secondary battery as a primary battery (for the purpose of only one time discharge after charging). Also, the all solid state battery of the present invention is usually a lithium battery.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically in reference to examples hereinafter.

Example 1

<Synthesis of Solid Electrolyte Material>

Starting raw materials $Li_2S$ (manufactured by Nippon Chemical Industrial Co., Ltd.) and $P_2S_5$ (manufactured by Sigma-Aldrich Japan K.K.) were weighed so as to be $Li_2S:P_2S_5=75:25$ at molar ratio; $Li_2S$ was 0.7656 g and $P_2S_5$ was 1.2344 g. $Li_2S$ and $P_2S_5$ were mixed in an agate mortar for 5 minutes, and then 4 g of heptane was put thereinto, and projected to a mechanical milling using a planetary ball mill for 40 hours to obtain a solid electrolyte material (sulfide glass).

<Production of Additive>

$Sb_2O_3$ (average particle diameter $D_{50}$: 8 μm) as an oxide, and polymethyl methacrylate (PMMA) (average particle diameter $D_{50}$: 0.1 μm) as a coating material were prepared. Weighed were 45 g of $Sb_2O_3$ and 5 g of PMMA. Each material was put into Nobilta™ (NOB-MINI) manufactured by Hosokawa Micron Corporation, the apparatus was operated for 30 minutes with the rotation number of 4000 rpm to produce an additive.

<Production of Battery>

(Production of Cathode Mixture)

Nickel cobalt lithium manganate ($LiNi_{1/3}Co_{1/3}O_2$) was used for an active material. The active material was coated with $LiNbO_3$ on its surface by a sol-gel method to obtain a cathode active material. Specifically, the surface of the above described active material was spray-coated with a composition such that equal mol of $LiOC_2H_5$ and $Nb(OC_2H_5)_5$ were dissolved in an ethanol solvent, by using a rolling and flowing coating apparatus (SFP-01, manufactured by Powrex Corp.). After that, the coated active material was subjected to a heat treatment for an hour at 350° C. under an atmospheric pressure. Weighed were 15.0 mg of the obtained cathode active material, 0.2 mg of VGCF of a conductive material carbon (manufactured by SHOWA DENKO K.K), 0.3 mg of a binder (PVDF), and 4.8 mg of the solid electrolyte material. Each component was sufficiently mixed so as to obtain a cathode mixture.

(Production of Anode Mixture)

Weighed were 10.0 mg of graphite for an anode active material, 0.2 mg of a binder (PVDF), and 6.7 mg of the solid electrolyte material; and 4 mg of the additive was mixed therewith so as to obtain an anode mixture.

(Assembly of All Solid State Battery)

Weighed in a 1 $cm^2$ ceramic mold was 18 mg of the solid electrolyte material, and it was pressed at 1 ton/$cm^2$ to produce a separate layer (solid electrolyte layer). In one side of the separate layer, 17.57 mg of the cathode mixture was put, and then pressed at 1 ton/$cm^2$ to produce a cathode layer. In the other side of the separate layer, 17.3 mg of the anode mixture was put, and then pressed at 4 ton/$cm^2$ to produce an anode layer. Further, an aluminum foil was used for the cathode current collector, and a copper foil was used for the anode current collector. An all solid state battery was produced in the above described manners.

Examples 2 to 9

All solid state batteries were produced in the same manner as in Example 1 except that the oxides and the coating materials shown in Table 1 were used for the additives and the anode mixtures were produced by adjusting the content of the additives in the anode layers. The rotation number of Nobilta™ during production of the additives were appropriately adjusted in the range of 3000 rpm to 6000 rpm, the rotation time was appropriately adjusted in the range of 10 minutes to 30 minutes.

Comparative Example 1

An all solid state battery was produced in the same manner as in Example 1 except that an additive was not used.

Comparative Examples 2 to 4

All solid state batteries were produced in the same manner as in Example 1 except that the oxides shown in Table 1 were added without forming the coating portions and the anode mixtures were produced by adjusting the addition amounts of the oxides into the anode layers.

TABLE 1

| | Oxide | Central particle size ($D_{50}$) [μm] | Coating material | Central particle size ($D_{50}$) [μm] | Oxide:Coating material (weight ratio) |
|---|---|---|---|---|---|
| Comparative Example 1 | — | — | — | — | — |
| Comparative Example 2 | $MnCO_3$ | 5 | — | — | — |
| Comparative Example 3 | $MoO_3$ | 10 | — | — | — |
| Comparative Example 4 | $Sb_2O_3$ | 8 | — | — | — |
| Example 1 | $Sb_2O_3$ | 8 | PMMA | 0.1 | 90:10 |
| Example 2 | $MnCO_3$ | 5 | PVC | 0.1 | 75:25 |
| Example 3 | $MoO_3$ | 10 | PP | 0.5 | 75:25 |
| Example 4 | $MnCO_3$ | 1 | PVC | 100 | 50:50 |
| Example 5 | $Sb_2O_3$ | 8 | PMMA | 0.1 | 90:10 |
| Example 6 | $MnCO_3$ | 20 | Butyl poly methacrylate | 0.2 | 90:10 |
| Example 7 | $MnCO_3$ | 20 | Butyl poly acrylate | 0.1 | 90:10 |
| Example 8 | $MnCO_3$ | 20 | PE | 0.5 | 75:25 |
| Example 9 | $Sb_2O_3$ | 8 | PMMA | 0.1 | 90:10 |

[Evaluation]
<Production of Charged Electrode and Measurement of Coulomb Efficiency>

The produced all solid state battery was set to a restraining jig, put into a container connected to a terminal, and hermetically sealed. The sealed container with the battery inside was disposed inside a thermostatic tank at 25° C. After confirming the battery's temperature being 25° C., charge and discharge were begun. Conditions for the charge and discharge were: constant current: 1/20 C, termination current: 1/100 C, charge voltage: 4.5 V, and discharge voltage: 3.0 V. After completing the charge and discharge, only the charge was conducted again. Confirmed the battery's voltage being 4.5 V by the charge, the battery was disassembled carefully not to cause a short circuit. The cathode at the boundary of the separate layer was peeled off from the battery taken out from the tank, and the anode on the other side was similarly peeled off.

The battery performance was evaluated by measuring the coulomb efficiency at the time of the first charge and discharge. The result is shown in Table 2. In Table 2, ○ refers to the coulomb efficiency being in the range of 80% to 100%, Δ refers to the coulomb efficiency being in the range of 60% to 79%, and X refers to the coulomb efficiency being in the range of 0% to 59%.

<Measurement of Exothermic Behavior>

Figure 3:
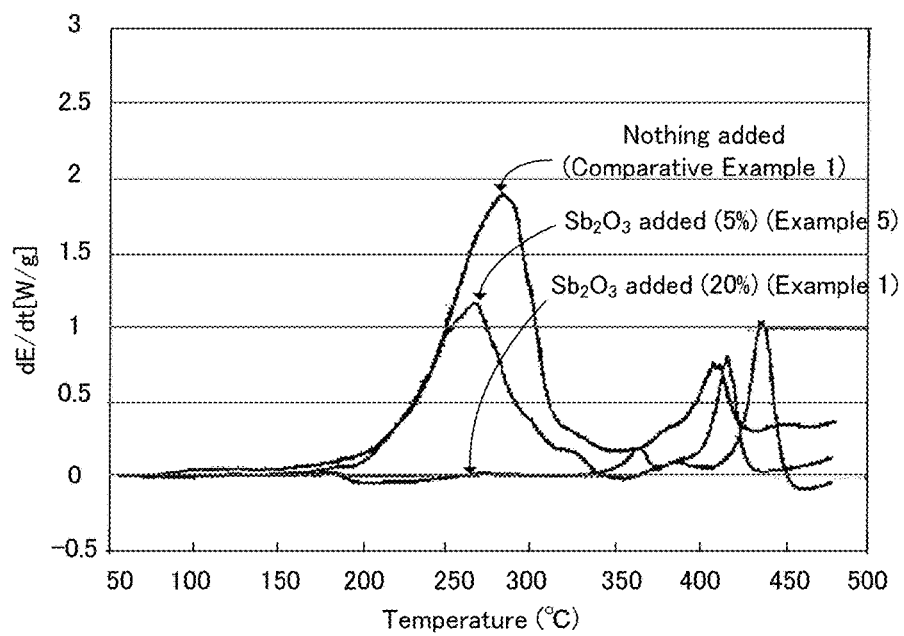
FIG. 3 is the result of measurement for the accumulated calorific value in Comparative Example 1, Example 1, and Example 5.

A portion (sample) of the charged anode except for the current collector foil was weighed in an SUS container for DSC (Differential Scanning calorimetry) so as to be 5 mg, and the container was hermetically sealed. The hermetically sealed SUS container with the sample inside was set in a DSC apparatus (manufactured by Hitachi High-Tech Science Corporation) and the measurement was conducted. The measurement conditions were: reference $Al_2O_3$: 5 mg, temperature rising speed: 5° C./min, and end temperature: 500° C. The (accumulated) calorific value of each sample was confirmed by the result of DSC. The result is shown in Table 2. The calorific value in Table 2 is the value integrated the calories from 70° C. to 380° C. The results of DSC measurement in Comparative Example 1, Example 1 and Example 5 are shown in FIG. 3.

TABLE 2

| | Oxide | Coating material | Additon amound [%] | Battery performance | Calorific value [J/g] |
|---|---|---|---|---|---|
| Comparative Example 1 | — | — | — | ○ | 1047 |
| Comparative Example 2 | $MnCO_3$ | — | — | x | unmeasurable |
| Comparative Example 3 | $MoO_3$ | — | — | x | unmeasurable |
| Comparative Example 4 | $Sb_2O_3$ | — | — | x | unmeasurable |
| Example 1 | $Sb_2O_3$ | PMMA | 20 | ○ | 370 |
| Example 2 | $MnCO_3$ | PVC | 20 | ○ | 183 |
| Example 3 | $MoO_3$ | PP | 20 | ○ | 226 |
| Example 4 | $MnCO_3$ | PVC | 10 | ○ | 470 |
| Example 5 | $Sb_2O_3$ | PMMA | 5 | ○ | 790 |
| Example 6 | $MnCO_3$ | Butyl poly methacrylate | 15 | ○ | 390 |
| Example 7 | $MnCO_3$ | Butyl poly acrylate | 15 | ○ | 400 |
| Example 8 | $MnCO_3$ | PE | 15 | ○ | 400 |
| Example 9 | $Sb_2O_3$ | PMMA | 30 | Δ | 440 |

AS shown in Table 2, it was confirmed that the calorific values in Examples 1 to 9, in which the oxide and the additive having a coating portion were added, was smaller than the calorific value of Comparative Example 1, in which the additive was not added. Also, as shown in FIG. 3, it was confirmed that about 200° C. of calorie was suppressed in Example 1, in which the additive was added at the ratio of 20% by weight to the anode mixture, compared to Comparative Example 1, in which the additive was not added to the anode mixture. It is presumed that the reaction of $Li_3PS_4 + 5Li \rightarrow 4Li_2S + P$ occurs in Comparative Example 1. The calorific value due to this reaction is 830 kJ/mol at calculated value.

On the contrary, it was presumed that the exothermic reaction of $Li_3PS_4$ and Li was inhibited by the reaction of Li with the oxide in Example 1. It is presumed that the reaction of $Sb_2O_3 \rightarrow LiSb_2O_3$ occurs in Example 1.

The battery performance in Example 9 was deteriorated compared to that in Example 1. Elasticity of the anode mixture was possibly increased due to the increase in the ratio of the additive in the anode mixture. Accordingly, a defect may have occurred during the production of the anode layer by pressing the anode mixture.

Also, the calorific value in Example 9 was higher than that of Example 1. It was possible that longer time was necessary for the coating portion to be softened or decomposed since the ratio of the additive in the anode mixture was increased in Example 9, compared to Example 1. Accordingly, it is possible that the timing of the reaction between the oxide and Li delayed compared to Example 1, so that the calorific value increased.

<Shape of Additive>

The additive was observed by SEM. In Example 4, it was confirmed that plural particles of $MnCO_3$ were buried in PVC. On the other hand, it was confirmed that a resin coated the particle of one oxide in other Examples. It was confirmed that the oxide was buried in the coating portion when the average particle diameter of the oxide was small with respect to the average diameter of the coating material, and the oxide was coated with the coating portion when the average diameter of the oxide was large with respect to the average diameter of the coating material, even if the same Nobilta™ was used.

REFERENCE SIGNS LIST

1 . . . cathode layer
1a . . . cathode active material
1b . . . conductive material
2 . . . anode layer
2a . . . anode active material
2b . . . additive
2c . . . oxide
2d . . . coating portion
3 . . . solid electrolyte layer
3a . . . sulfide solid electrolyte material
4 . . . cathode current collector
5 . . . anode current collector
10 . . . all solid state battery

What is claimed is:

1. An all solid state battery comprising a cathode layer, an anode layer, and a solid electrolyte layer formed between the cathode layer and the anode layer, wherein
at least one of the anode layer and the solid electrolyte layer contains a sulfide solid electrolyte material,
the anode layer contains an anode active material that is graphite, and contains an additive, and
the additive has an oxide that is at least one kind of $MoO_3$, $Sb_2O_3$, and $MnCO_3$, and a coating portion that coats at least a part of the oxide and includes a resin with a hydrocarbon chain as a main chain.

2. The all solid state battery according to claim 1, wherein a content of the additive in the anode layer is within a range of 5% by weight to 30% by weight.

3. The all solid state battery according to claim 1, wherein the resin with a hydrocarbon chain as a main chain is a resin that is softened or decomposed in a range of 100° C. to 200° C.

4. The all solid state battery according to claim 1, wherein an average thickness of the coating portion is in a range of 100 nm to 1000 nm.

* * * * *